United States Patent Office 3,298,412
Patented Jan. 17, 1967

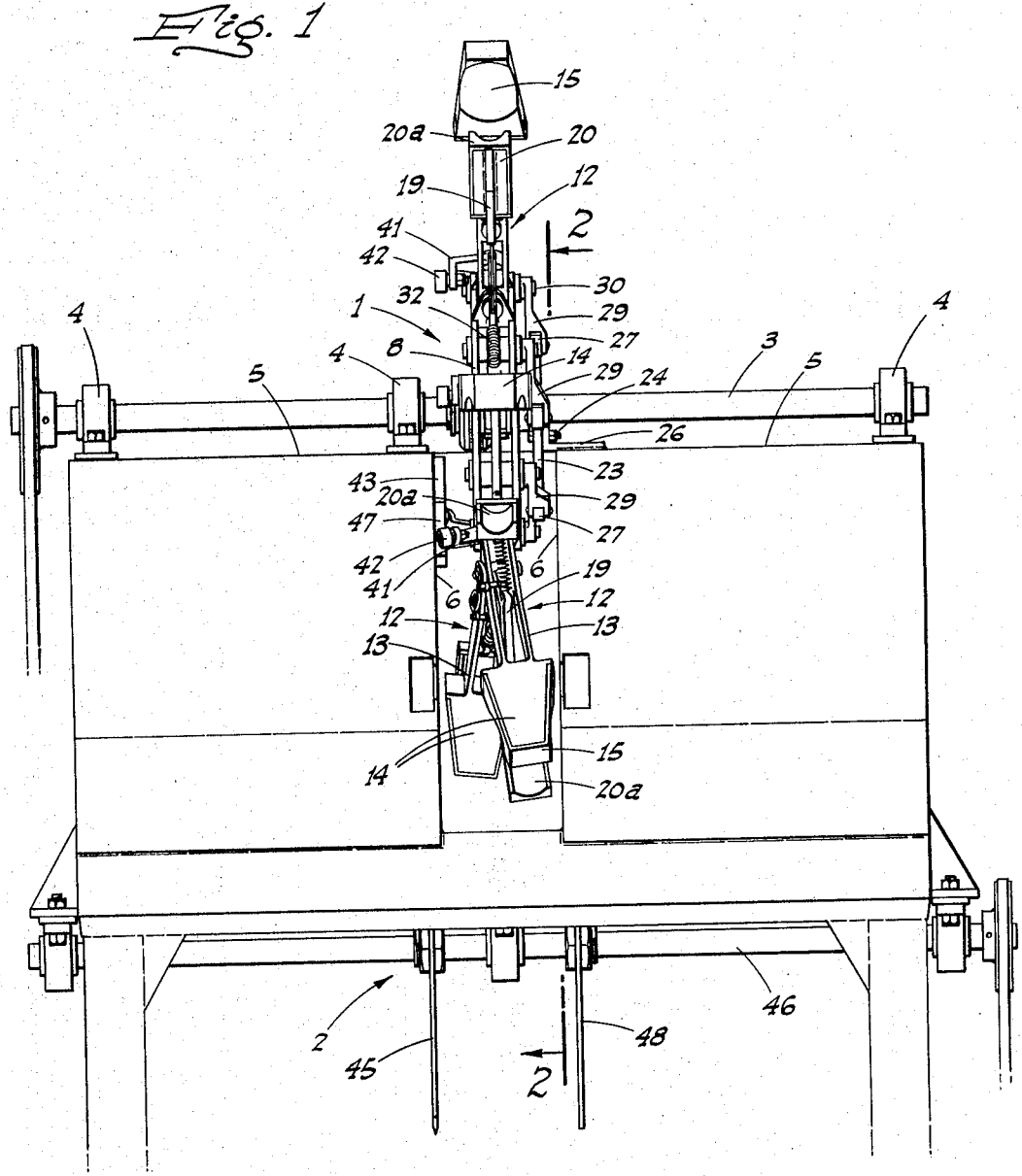

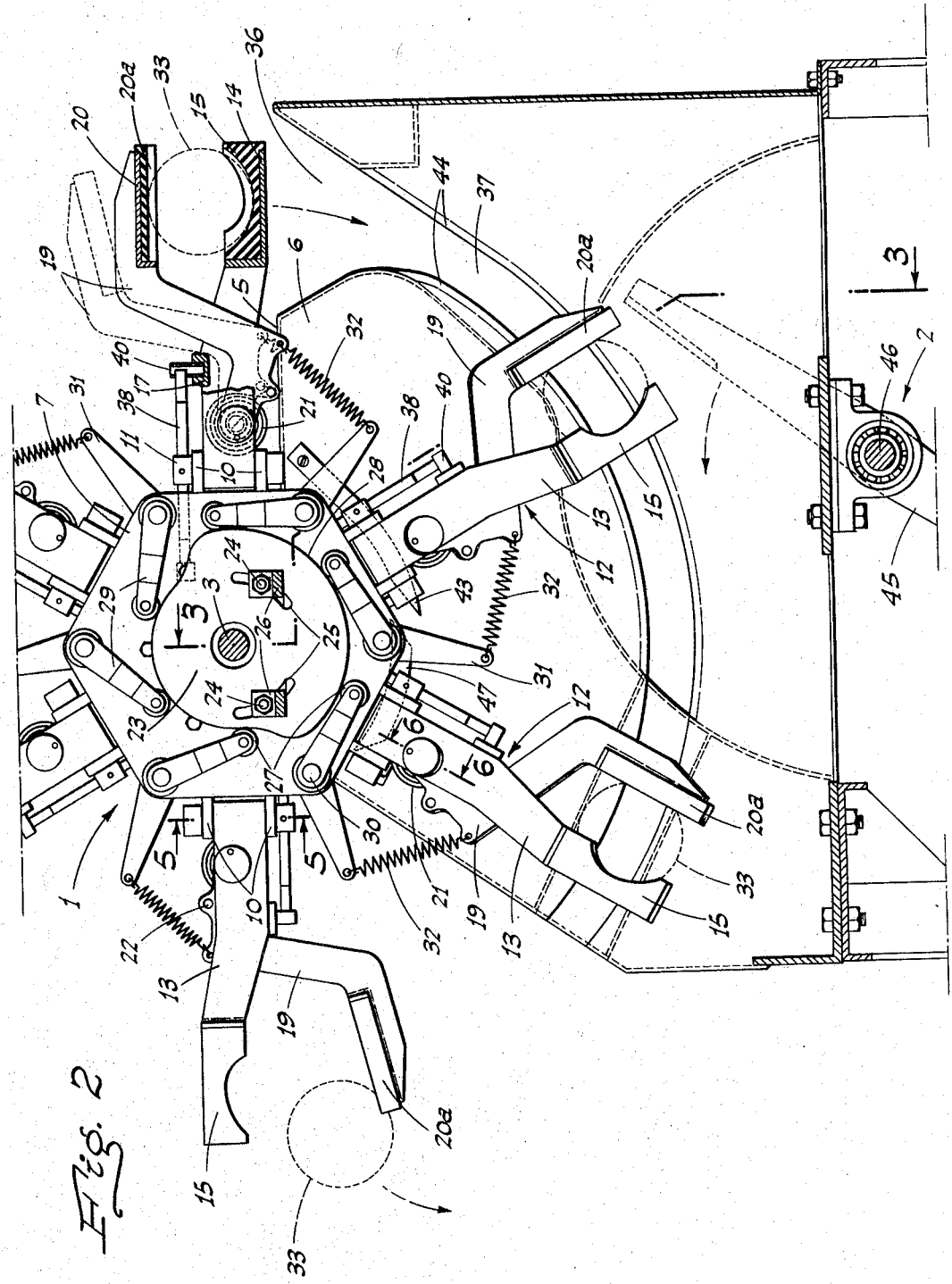

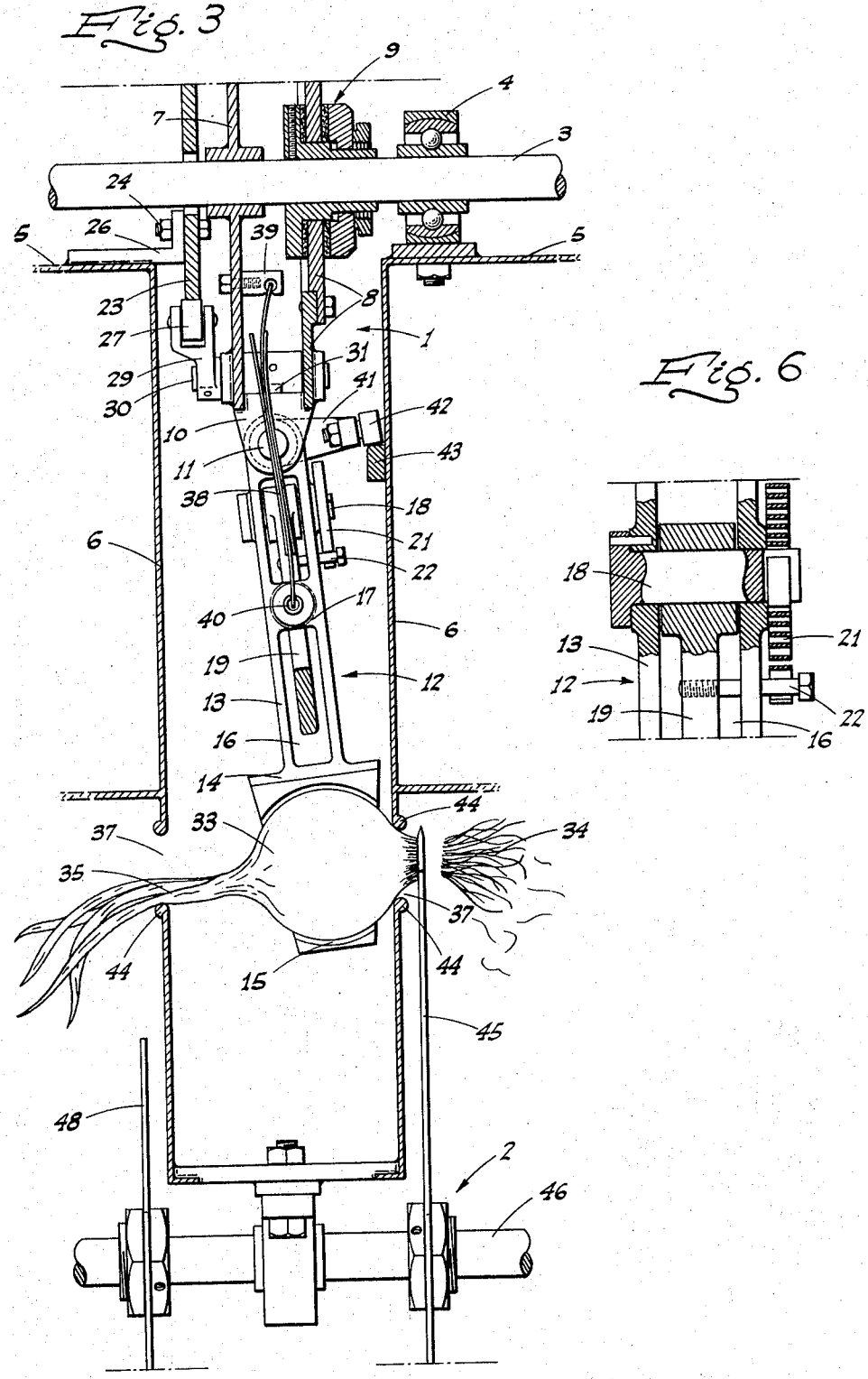

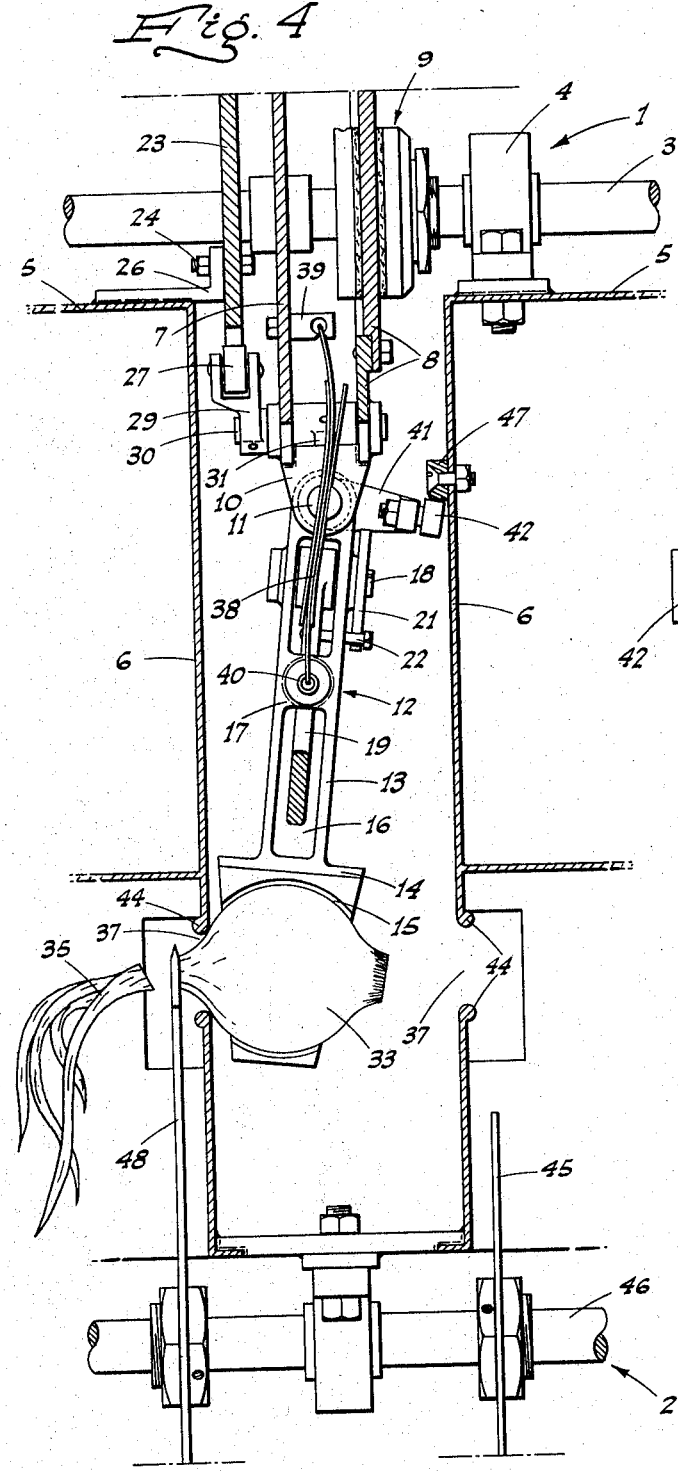
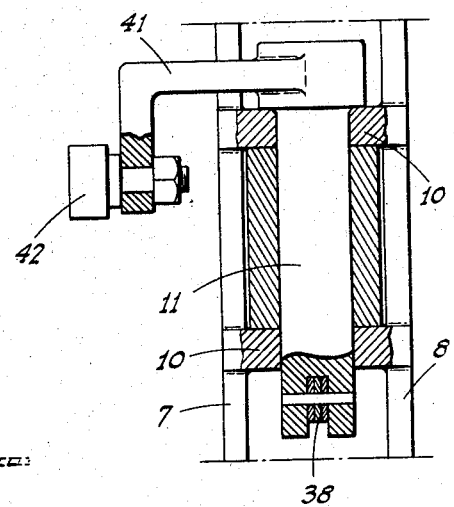

3,298,412
ONION TRIMMING MACHINE
Luverne R. Smida, Stockton, Calif., assignor to Wilcox Manufacturing Company, Stockton, Calif., a partnership
Filed July 20, 1964, Ser. No. 383,637
8 Claims. (Cl. 146—83)

This invention relates to vegetable trimming machines, and particularly to one designed to trim both the roots and tops from onions after they have been dug from the ground or harvested and before they are placed in sacks or the like for shipment.

The major object of this invention is to provide a machine—for the purpose described and to which the onions are individually fed by hand or otherwise—which includes means operative in a manner such that said individual onions are temporarily and firmly held or gripped in a certain position while traversing a predetermined path; there being other means, functioning while the onions are so gripped, to trim the roots and then the tops from such onions before they are released.

As the onions are not graded before they are trimmed, they are of different sizes, while the trimming means of the machine comprises rotary knives—between which the onions pass—spaced apart a fixed distance greater than the end-to-end dimension of any onion. It is, therefore, another important object of this invention to mount and control the onion gripping means relative to the knives in a manner such that each gripped onion will be shifted endwise, first toward one knife and then toward the other, whereby the ends of the onion—regardless of its size—will be successively disposed the same distance from the related knife, and the roots and tops will be trimmed from each onion to the same extent in all cases.

A further object is to provide a machine—for the purpose described—which trims the onions in such a manner that the onions are not bruised or otherwise damaged, and are not stained by the juices issuing from the cut necks or otherwise soiled; the onions thus remaining in good condition to pass inspection and for market sale.

A further object of the invention is to provide an onion trimming machine which is designed for ease and economy of manufacture.

A still further object of the invention is to provide a practical, reliable, and durable onion trimming machine and one which is exceedingly effective for the purpose for which it is designed.

These objects are accomplished by means of such structure and relative arrangement of parts as will fully appear by a perusal of the following specification and claims.

In the drawings:

FIG. 1 is a rear end elevation of the onion trimming machine.

FIG. 2 is an enlarged fragmentary sectional elevation of the machine, taken on line 2—2 of FIG. 1.

FIG. 3 is a fragmentary enlarged transverse section of the machine, taken substantially on line 3—3 of FIG. 2, and showing the roots being trimmed from an onion.

FIG. 4 is a similar view, but showing the top being trimmed from the onion.

FIG. 5 is a fragmentary enlarged section taken on line 5—5 of FIG. 2.

FIG. 6 is a fragmentary enlarged section taken on line 6—6 of FIG. 2.

Referring now more particularly to the drawings and to the characters of reference marked thereon, the onion trimming machine comprises essentially a rotary, onion supporting carrier indicated generally at 1, and a rotary, onion trimming unit indicated generally at 2.

The rotary carrier 1 comprises a horizontal shaft 3 driven at relatively slow speed in any suitable manner and turnable in journals 4 on top of end-spaced supporting members 5; said members 5 extending below the journals and shaft and including vertical walls 6 disposed in facing relation to each other and at right angles to the shaft 3. Such walls are spaced apart a distance greater than the end-to-end dimension of any onion to be handled in the machine.

Mounted on the shaft 3 in spaced relation lengthwise of the shaft and disposed centrally of the space between the walls 6 are discs 7 and 8. The disc 7 is turnable on the shaft, but the disc 8 is operatively connected thereto by a friction clutch unit 9. These two discs, however, are connected in rigid relation by a series of evenly circumferentially spaced pairs of spaced apart ears 10 which are disposed substantially radially of the shaft 3 and project from the periphery of the discs.

Each pair of ears supports a pin 11 which is disposed at right angles to the shaft, and on which pin a generally radially projecting onion holding or gripping unit 12 is mounted. This unit comprises a rigid arm 13 provided on the outer end with a jaw 14 fitted with an onion seating and locating cup 15 of soft rubber or other cushion material, as shown in FIG. 2. The jaw 14 is so related to the arm and to the direction of rotation of the shaft that the cup 15 faces upwardly when the arm 13 is in a horizontal position and is on its downward movement.

The arm 13—for practically its full length between the pin 11 and the jaw 14—is formed with a slot 16 which is interrupted only by a cross bar 17 on the rear side of the arm. A cross pin 18 is mounted in the arm 13 between the pin 11 and the cross bar 17, and is held in a fixed position in said arm. Another arm 19 is turnable at its inner end on the pin 18 which is disposed at right angles to said pin 11; said arm 19 being formed so as to project first forwardly from the arm 13, and then rearwardly thereof radially out from the cross bar 17.

At its outer end, the arm 19 is formed with a jaw 20 fitted with a channeled cushion pad 20a adapted to cooperate with the jaw 14 in opposed onion holding or gripping relation.

A spiral spring 21 is secured at its inner end on one end of the cross pin 18, and at its outer end said spring engages against a pin 22 fixed on the forwardly projecting part of arm 19 a short distance from said pin 18. The spring 21 is thus arranged to yieldably act on the arm 19 whereby to swing the same so as to maintain the jaws 14 and 20 initially relatively widely separated, as shown at the left-hand side of FIG. 2.

The relatively movable arm 19 is pulled to a jaw closing and onion holding or gripping position, in opposition to the spring 21 and for substantially the lower 180 degree arc of rotation of the rotary carrier 1, by the following means:

Surrounding the shaft 3 adjacent but outwardly from the disc 7 is a cam plate 23 which is held in a fixed but rotatably adjustable position by means of clamping bolts 24. These bolts project through arcuate slots 25 in the cam plate 23 and clamp the latter to brackets 26 on the adjacent supporting member 5, as clearly shown in FIGS. 3 and 4.

A roller 27 engages the peripheral edge 28 of the cam plate 23; the roller being mounted on the outer end of an arm 29 which extends rearwardly, relative to the direction of rotation, from a cross pin 30 journaled in the discs 7 and 8. Secured on the cross pin 30 between the discs 7 and 8 is another arm 31; the latter being disposed at an obtuse angle to the arm 29 and extending substantially radially of the shaft 3. The outer end of the arm 31 is connected to the forwardly projecting part of the arm 19 by a tension spring 32.

The cam edge 28 is shaped so as to swing the arm unit 29-31 in a direction to relax the tension on spring 32 while through the upper portion of its arc of rotation. This allows the spring 21 to function to swing the arm 19 to a position with the jaws 14 and 20 open or separated, enabling an operator to seat an onion 33 on the cup 15 as the arm 13 descends toward a horizontal position. The onion, before being so seated, is held so that its major axis is substantially parallel to the shaft 3, or so that the roots 34 of the onion extend in the direction of one wall 6, while the onion tops 35 extend in the direction of the other wall 6 as shown.

Further, the cam edge 28 is shaped so that the arm unit 29-31 is swung in a direction to put the spring 32 under tension, and to close jaw 20 on the onion then seated in cup 15 of jaw 14, just before the arm 13 reaches a horizontal position. In this position the gripped engaged onion is disposed intermediate and just above the relatively wide entry end or mouth 36 of laterally alined slots 37 cut through the walls 6. Corresponding slots are wide enough to receive the onion roots and tops therethrough without binding; said slots, which are concentric with the shaft 3, not being of sufficient width to permit the passage of an onion therethrough.

In the lower portion of the arc of rotation and while the onion holding and gripping unit 12 and the onion held thereby are traveling the length of the slots, said unit 12 is swung—from its initially centralized position relative to the walls 6—first toward one wall and then toward the other. In one such swung position, the roots extending through one slot are cut from the gripped onion, and when in the other position, the tops extending through the other slots are cut from said onion; the trimmed onion after leaving the area of the slots being released and allowed to roll of itself from between the jaws as the latter are then caused to open or separate by the hereinbefore described cam and spring action. The jaw 20 is then lowermost and disposed with a slight downward slope to its outer end; such slope facilitating the self discharge of the onion from between the jaws, as indicated in FIG. 2.

These sequential trimming operations are effected by means of the features of construction now to be described:

A leaf spring 38 is rigidly connected intermediate its ends to one end of the turnable pivot pin 11 of the unit 12 and on which pin said unit is itself turnable. One end of the spring 38, which extends lengthwise of and substantially parallel to the arm 13 of the unit 12, is anchored as at 39 to the disc 7. The other end of said spring 38 is anchored to a pin 40 projecting from the cross bar 17. The unit 12 is thus normally but yieldably held from swinging about its pivot 11, and maintained in a centralized position in a plane extending between the walls 6.

An arm 41 is fixed on and projects from the other end of the pin 11 toward that one of the walls 6 through the slot 37 of which the onion roots project. A roller 42 on the outer end of the arm rides on the upper face of a cam strip 43 secured against said one wall and extending concentric with the shaft 3 along and above a considerable portion of the slot 37 from the entry end thereof. The cam strip 43 is arranged so that when the roller 42 is engaged therewith, and as the unit 12 initially advances, the pivot pin 11 will be rotated sufficiently to cause the spring 38 to be deflected so as to swing the unit 12 laterally toward said one wall 6. This in turn will cause the base of the onion to be projected through the adjacent slot until such base engages the edges of the slot, and which edges are rounded, as shown at 44, to prevent any possible bruising of the onion.

The onion roots 34 then project completely through the slot 37, and are in position to be severed by the action of the rotary trimming unit 2 and which comprises the following:

A rapidly moving knife 45 is mounted on and projects radially from a driven shaft 46 journaled in connection with and below the plates 6 parallel to the shaft 3. The knife 45 is disposed relatively close to the outer face of said one wall 6, and is sufficiently long to engage and cut through the roots of the onion as it moves along the slot 37, as indicated in FIG. 3. The knife shaft 46 is rotated at a much faster speed than the shaft 3 and in the opposite direction, as indicated in FIG. 2. This arrangement has been found to provide a very efficient and clean-cutting root trimming operation.

Upon leaving the cam strip 43, and with continued advance of the unit 12, the roller 42 immediately engages and rides on the lower face of another arcuate cam strip 47. The cam strip 47 is arranged to cause the unit 12 to be swung, by the action of spring 38, toward the other wall 6 so that the tops 35 of the onion are then wholly projected through the related slot 37. At such time the neck of the onion about said tops is pressed into firm engagement with the rounded edges 44 of said related slot 37, as shown in FIG. 4. This disposes the tops 35 of the onion in position to be completely trimmed or cut off by the action of another knife 48 also mounted on the shaft 46 and disposed on the outside and relatively close to said other wall 6.

After this trimming action has been effected, the roller 42 leaves the cam strip 47, and the spring 38 then returns the unit 12 to its initial centralized position between the walls 6.

Upon the trimmed onion passing out from between the confines of walls 6, the cam edge 28 acts on the arm unit 29-31 to remove the tension from or slacken the spring 32. This in turn allows the spring 21 to function to swing the arm 19 in a direction to open jaw 20 relative to jaw 14 and from gripping engagement with the trimmed onion. The latter then falls free of the jaws and onto a conveyor or other receiver (not shown) disposed in position to catch the falling onion.

With respect to the described structural arrangement of the machine, it is to be noted that:

The spring 32 enables the jaw arm 19 to be moved to an onion engaging position relative to the other jaw arm 13 irrespective of the size of the onion engaged between the jaws.

The spring 38 which yieldably controls the lateral swinging movement of the onion holding and gripping unit 12 assures that such unit will always be so moved the distance necessary to alternately dispose the base and then the neck of the onion in contact with the edges of the related slots 37 regardless of the size of the onion held by the jaws of said unit 12. This in turn insures that the roots and tops of the onion of any size will be cut or trimmed off as close to the body of the onion as possible by the corresponding rotary knives.

The friction or slip clutch 9—interposed between the constantly driven shaft 3 and the assembly of the rotary onion holding or gripping units mounted thereon—prevents harm being done should an extremity of the operator be caught in such rotary assembly.

Although only a single rotary trimming machine has been here shown and described, a plurality of such machines may be mounted in suitably spaced side-by-side relation with shafts 3 and 46 common to all the machines; the number of such machines employed in any one installation depending on the anticipated volume of onions.

While onions have been specifically mentioned as being the produce to be trimmed, the machine is also suited to handle garlic.

From the foregoing description, it will be readily seen that there has been produced such a machine as substantially fulfills the objects of the invention, as set forth herein.

While this specification sets forth in detail the present and preferred construction of the machine, still in practice such deviations from such detail may be resorted to as do not form a departure from the spirit of the invention, as defined by the appended claims.

Having thus described the invention, the following is claimed as new and useful and upon which Letters Patent is desired:

1. An onion trimming machine comprising a horizontal shaft, an arm unit mounted on the shaft for rotation and extending substantially radially thereof, means to rotate the unit, onion gripping jaws on the outer end of the arm unit adapted to support an onion with its major axis substantially parallel to the shaft so that the roots and tops of the onion project from opposite ends of the jaws, spring means tending to hold the jaws open, and means including a spring acting in opposition to said spring means to hold the jaws closed for a predetermined arc of rotation of the shaft, and means to trim off said roots and tops of the gripped onion as the shaft and unit rotate and while the jaws are closed.

2. An onion trimming machine comprising a horizontal shaft, an arm unit mounted on the shaft for rotation and extending substantially radially thereof, means to rotate the unit, onion gripping jaws on the outer end of the arm unit adapted to support an onion with its major axis substantially parallel to the shaft so that the roots and tops of the onion project from opposite ends of the jaws, trimming knives mounted beyond the paths of the ends of the jaws and the onion gripped thereby in position to engage and trim off the roots and tops of the onion in successive order as the arm unit moves past said knives, and means functioning as the arm unit so moves arranged to shift the unit endwise toward one knife as said unit approaches the same and to then shift said unit endwise toward the other knife subsequent to the functioning of said one knife.

3. An onion trimming machine comprising a horizontal shaft, a driven disc mounted on the shaft, an arm unit extending substantially radially of the shaft and mounted on the disc for rotation therewith, onion gripping jaws on the outer end of the arm unit adapted to support an onion with its major axis substantially parallel to the shaft so that the roots and tops of the onion project from opposite ends of the jaws, a pair of fixed walls disposed in spaced relation at right angles to the shaft and between which walls the arm unit passes in clearance relation, said walls having open-ended slots therethrough concentric with the shaft and positioned to receive the roots and tops of the gripped onion therethrough as the arm unit rotates and passes between the walls and knives mounted outwardly of but adjacent the walls and arranged to extend across the slots to trim off the roots and tops from the gripped onion as the arm unit moves lengthwise of the slots.

4. A machine, as in claim 3, in which the arm unit is pivotally mounted on the disc for swinging movement in a direction longthwise of the shaft; there being means functioning as the arm unit moves lengthwise of the slots to first swing said unit toward one wall so that the base of the onion engages against said wall at the edges of the related slot and is held in such position during a portion of the length of the slot, and to then swing the arm unit toward the opposite wall so that the neck of the onion engages against said other wall at the edges of the related slot and is held in such position during a portion of the length of said last named slot.

5. A machine, as in claim 4, in which said means includes a spring yieldably acting on the arm unit and tending to stabilize said arm unit in a radial plane extending centrally between the plates.

6. A machine, as in claim 4, in which said means comprises a radial arm connected to the pivot of the arm unit and projecting toward one wall, a cam engaging element on the outer end of the radial arm, successively functioning cams extending along and fixed on said one wall to engage said element and cause the pivot to be rotated first in one direction and then the other, the arm unit being turnable on said pivot, and a leaf spring extending lengthwise of the arm unit and secured intermediate its ends to one end of the pivot; said spring at one end being anchored to the disc at a point between the pivot and shaft, and at the other end being anchored to the arm unit intermediate the ends thereof.

7. A machine, as in claim 3, in which the shaft is driven, with a slip-clutch connection between the disc and shaft.

8. A machine, as in claim 3, in which the arm unit comprises one arm directly mounted on the disc and another arm pivoted on said one arm, the jaws being on the outer ends of the arms, spring means between the arms tending to hold the jaws open, and jaw closing means comprising a normally relatively slack tension spring connected at one end to said other arm to swing the same to a jaw closing position when placed under tension and against the resistance of said spring means, a stationary cam plate disposed about the shaft, and cam actuated means mounted on the disc and connected to the other end of the tension spring to so tension the same while the arm unit is passing between the walls.

References Cited by the Examiner

UNITED STATES PATENTS

| | | | |
|---|---|---|---|
| 1,571,169 | 1/1926 | Keller | 146—81 X |
| 2,204,846 | 6/1940 | Dotta | 146—81 |
| 2,494,914 | 1/1950 | Urschel et al. | 146—83 |
| 2,687,156 | 8/1954 | Laurence | 146—81 X |
| 3,075,634 | 1/1963 | Schwacofer. | |

WILLIAM W. DYER, JR., *Primary Examiner.*

JAMES M. MEISTER, *Examiner.*